Figure 1:
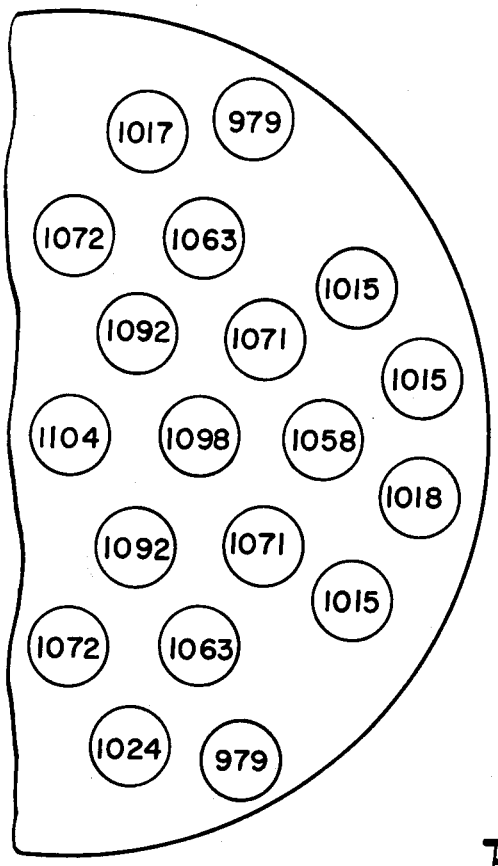
Figure 2:
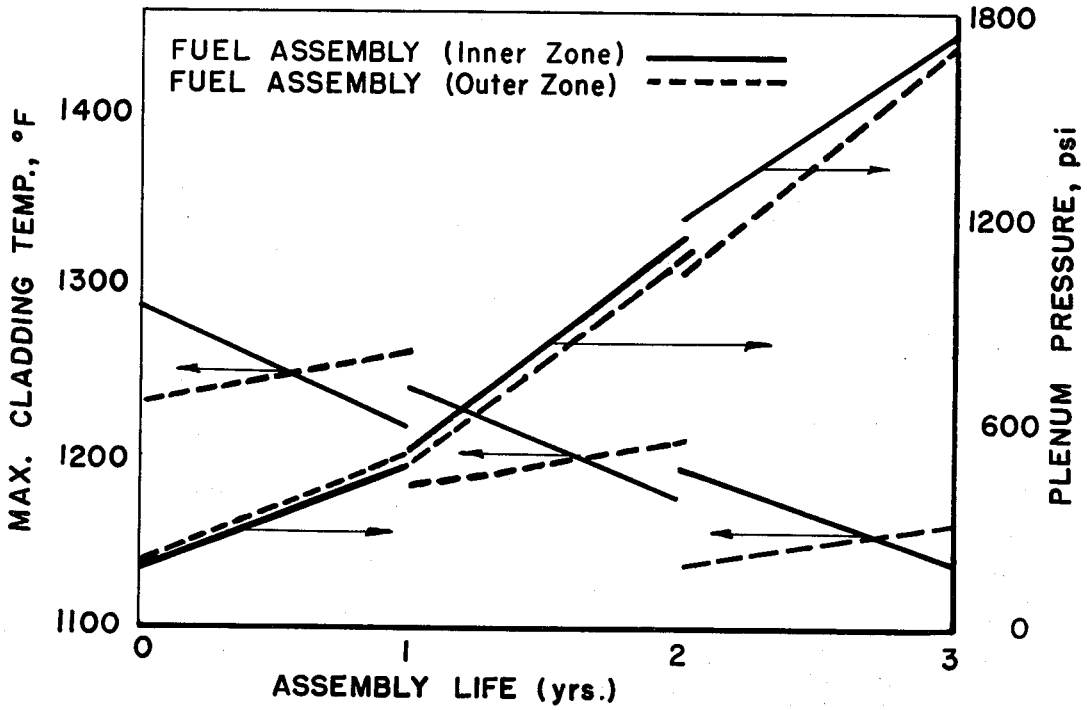

United States Defensive Publication [19] (H) [11] T966,004

Carelli et al. [43] Jan. 3, 1978

[54] METHOD OF COOLING A FAST-BREEDER REACTOR

[75] Inventors: Mario D. Carelli, Greensburg; Christopher W. Bach, North Huntingdon Township, Westmoreland County, both of Pa.

[73] Assignee: The United States of America as represented by the United States Energy Research and Development Administration, Washington, D.C.

[21] Appl. No.: 789,315

[22] Filed: Apr. 20, 1977

Related U.S. Application Data

[63] Continuation of Ser. No. 699,392, June 24, 1976, abandoned.

[51] Int. Cl.[2] ..... G21C 1/02

[52] U.S. Cl. ..... 176/40; 176/18; 176/38; 176/50; 176/61

[57] ABSTRACT

Operation of a liquid-metal-cooled fast-breeder reactor is enhanced by distributing coolant among the fuel assemblies at such a rate that the strain equivalent limiting temperature of each fuel assembly is closely approached but not exceeded. Further improvement is attained by proportionally allocating less coolant of a total prescribed coolant flow to the outer fuel assemblies of the reactor (yet satisfying the condition that the strain equivalent limiting temperature is not exceeded) whereby additional coolant flow is available for the inner fuel assemblies, thereby further reducing the radial thermal gradient in the coolant immediately above the fuel assemblies, a particular advantage being that the temperature of the upper internal structure of the reactor immediately above the inner zone of the reactor is reduced.

3 Claims, 1 Sheet Drawing,

14 Pages Specification

The file of this unexamined application may be inspected and copies thereof may be purchased (849 O.G. 1221, Apr. 9, 1968).